(12) United States Patent  (10) Patent No.: US 6,655,054 B1
Ward  (45) Date of Patent: Dec. 2, 2003

(54) QUICK HITCH ATTACHMENT

(75) Inventor: Peter John Ward, Fausset Road, Ararimu, Auckland (NZ)

(73) Assignee: Peter John Ward, Auckland (NZ)

( * ) Notice: Subject to any disclaimer, the term of this patent is extended or adjusted under 35 U.S.C. 154(b) by 0 days.

(21) Appl. No.: 10/049,772

(22) PCT Filed: Aug. 18, 2000

(86) PCT No.: PCT/NZ00/00163

§ 371 (c)(1),
(2), (4) Date: May 8, 2002

(87) PCT Pub. No.: WO01/14650

PCT Pub. Date: Mar. 1, 2001

(30) Foreign Application Priority Data

Aug. 19, 1999 (NZ) ............................................. 335830
Jun. 29, 2000 (NZ) ............................................. 505442

(51) Int. Cl.$^7$ ................................................. E02F 3/96
(52) U.S. Cl. ........................ 37/406; 414/912; 414/724
(58) Field of Search ....................... 37/403, 468, 405, 37/406, 903; 414/723, 724, 912, 729, 733, 740

(56) References Cited

U.S. PATENT DOCUMENTS

| 3,252,606 | A | * | 5/1966 | Pryor ........................ 414/704 |
| 3,802,731 | A | | 4/1974 | La Bounty |
| 4,068,959 | A | | 1/1978 | Pemberton |
| 4,104,792 | A | | 8/1978 | LaBounty |
| 4,248,471 | A | | 2/1981 | LaBounty |
| 4,266,819 | A | | 5/1981 | Pemberton |
| 4,375,345 | A | * | 3/1983 | Hanson ...................... 414/722 |
| 4,403,431 | A | * | 9/1983 | Ramun et al. ................ 37/406 |
| 4,413,945 | A | | 11/1983 | LaBounty |
| 4,423,997 | A | | 1/1984 | Pemberton |
| 4,450,625 | A | | 5/1984 | Ramun |
| 4,519,135 | A | * | 5/1985 | LaBounty ................... 30/134 |
| 4,635,386 | A | * | 1/1987 | Kobayasi .................... 37/406 |
| 4,670,983 | A | | 6/1987 | Ramun et al. |
| 4,897,921 | A | | 2/1990 | Ramun |
| 5,062,227 | A | * | 11/1991 | De Gier et al. .............. 37/406 |
| 5,111,602 | A | * | 5/1992 | Risch ......................... 37/406 |
| 5,271,170 | A | * | 12/1993 | Mieger ....................... 37/406 |
| 5,384,962 | A | | 1/1995 | Pemberton |
| 5,544,435 | A | * | 8/1996 | Somero ....................... 37/405 |
| 5,549,440 | A | * | 8/1996 | Cholakon et al. ........... 414/723 |

(List continued on next page.)

FOREIGN PATENT DOCUMENTS

| GB | 1 443 093 | | 7/1976 |
| GB | 2169582 | * | 7/1986 |
| JP | 1-127728 | * | 5/1989 |
| NL | 9101437 | | 3/1993 |
| WO | WO 92/18708 | | 10/1992 |

Primary Examiner—Victor Batson
(74) Attorney, Agent, or Firm—Greer, Burns & Crain, Ltd.

(57) ABSTRACT

An attachment for a prime mover or backhoe which may be used to cut or crush material. The attachment includes a first jaw, being a fixed jaw, and a second jaw being a free jaw which is pivotably connected to the fixed jaw, and at least three connectors which allow the attachment to be connected to the actuator arm of a prime mover or backhoe. These connectors include a head connector adapted to provide a connection to the head of the actuator arm, and a driven connector adapted to provide a connection to the driving beam of the backhoes actuator arm, and a strut connector adapted to provide a connection to the strut of the backhoes actuator. The head and driven connectors are associated with the fixed jaw and the strut connector is associated with the free jaw, where the head and driven connectors are connected to the prime mover or backhoe with a quickhitch. The arrangement is such that when in use the distance between the driven and head connectors remains constant and the distance between the driven and strut or head and strut connectors varies.

12 Claims, 4 Drawing Sheets

U.S. PATENT DOCUMENTS

| | | | | |
|---|---|---|---|---|
| 5,581,917 A | * | 12/1996 | Barden | 37/468 |
| 5,692,325 A | * | 12/1997 | Kuzutani | 37/468 |
| 5,951,192 A | * | 9/1999 | Collins | 403/150 |
| 5,957,650 A | * | 9/1999 | Rollo | 414/724 |
| 6,058,633 A | * | 5/2000 | Barden | 37/468 |
| 6,209,237 B1 | * | 4/2001 | Heiple et al. | 37/406 |
| 6,260,294 B1 | * | 7/2001 | Pitcher | 37/406 |
| 6,308,442 B1 | * | 10/2001 | Naka et al. | 37/468 |
| 6,350,079 B1 | * | 2/2002 | Williams | 403/326 |
| 6,422,805 B1 | * | 7/2002 | Miller | 414/723 |
| 6,438,875 B1 | * | 8/2002 | Kimble et al. | 37/468 |
| 6,453,586 B1 | * | 9/2002 | Wolin et al. | 37/406 |

* cited by examiner

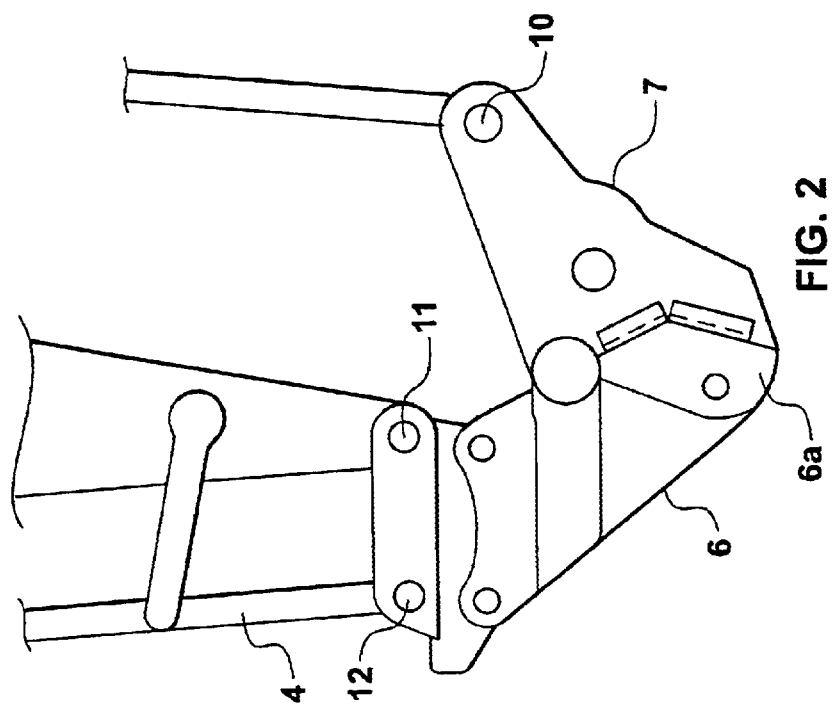
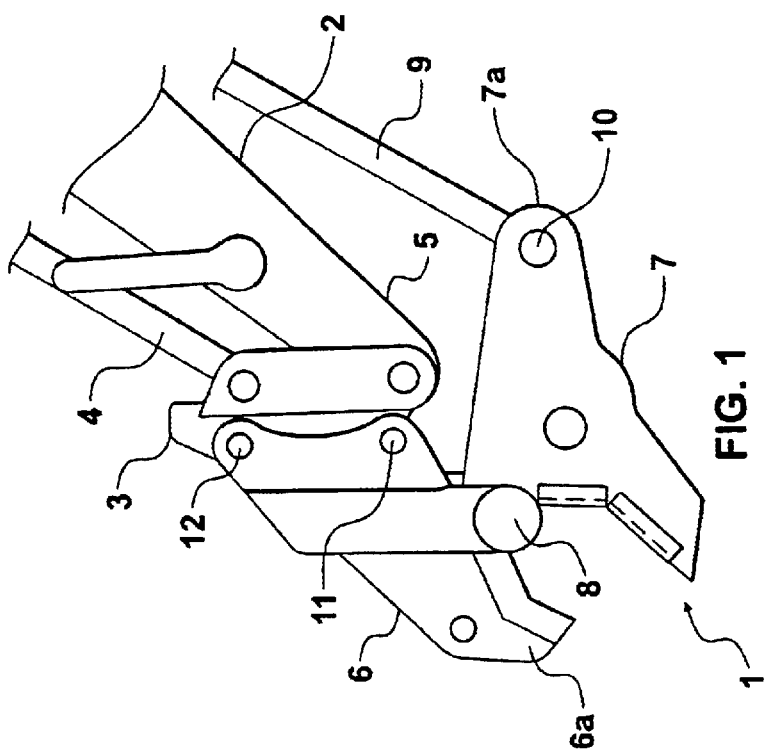

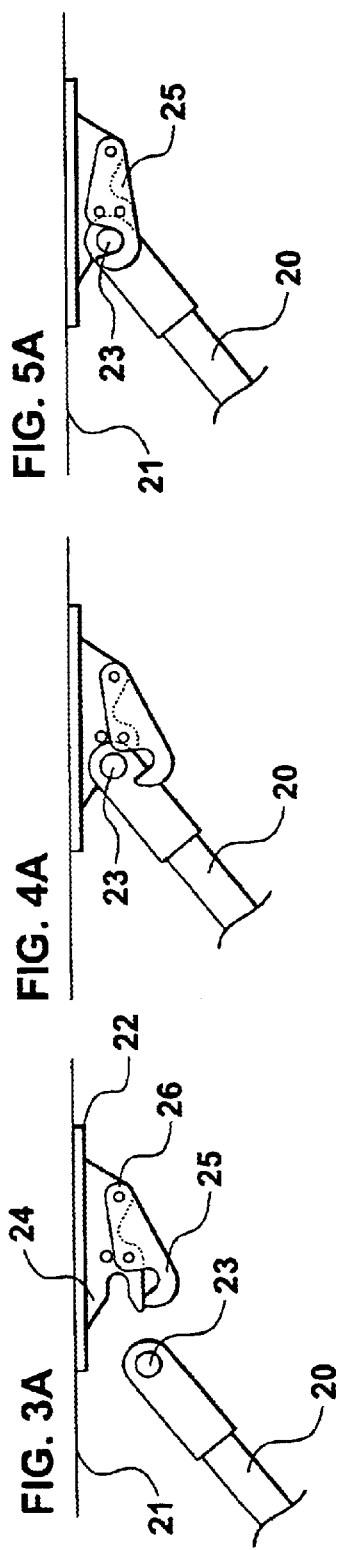

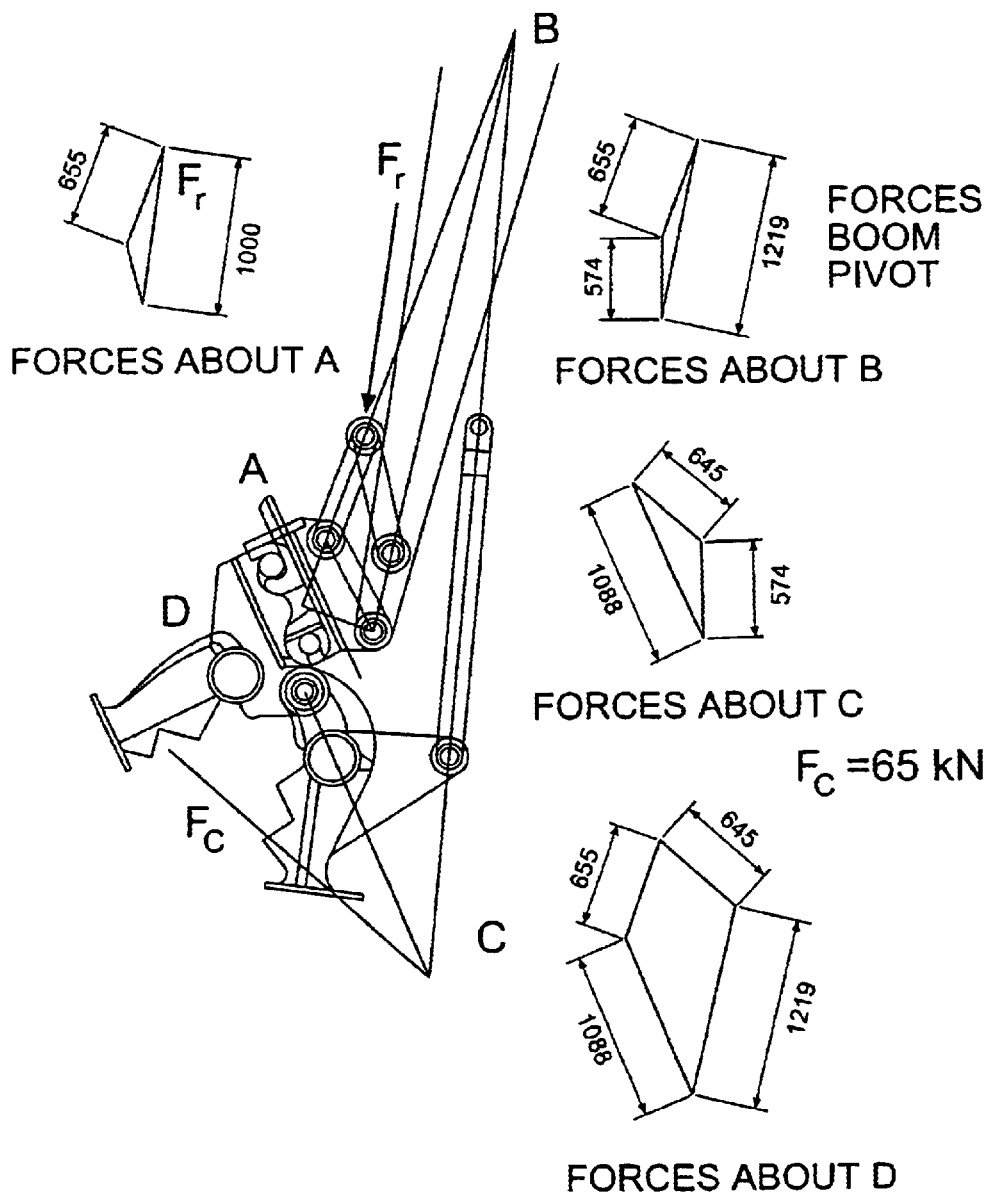

QUICK HITCH ATTACHMENT

TECHNICAL FIELD

This invention relates to devices used to cut and pulverise materials. Specifically the present invention may be used in the demolition trade to provide a jaw attachment for an excavator and may be configured to be easily and quickly removed from or attached to an excavator. The present invention may also be adapted to engage with a quickhitch located between elements of the excavator and the jaw, where the inclusion of a quickhitch improves the efficiency and the cutting or cutting strength of the attachment.

Reference throughout this specification will also be made to the present invention being configured to provide a cutting or pulverising jaw attachment for an excavator used in demolition work. However, it should be appreciated by those skilled in the art that other applications are envisioned for the present invention and reference to the above only throughout this specification should in no way be seen as limiting.

BACKGROUND ART

A number of cutting, crushing or manipulating jaws have previously been developed which attach to an excavator or other similar heavy machinery. These attachment jaws can be used in the demolition industry to cut up metal structures or crush concrete structures.

Such attachments are connected to the free end of an excavator's actuator arm. The free end of such an arm includes a main head portion, a support strut adjacent to the head portion (and attached to the arm further back from the head) and lastly an actuator beam adjacent the head portion which may move towards and away on the head portion to actuate or operate attachments connected to the excavator.

One relatively effective form of attachment jaw developed for an excavator is produced by Pemberton Incorporated of Longwood, Orlando, Fla., United States of America. This attachment may be termed a 'self-driven' jaw as it relies only on the actuator beam of the excavator to open and close the jaw when the device is in use. This may be contrasted with other known types of attachment jaws that employ their own self-contained hydraulic or pneumatic rams to drive portions of the jaws. Therefore these devices also require connections to sources of hydraulic fluid or pressurised gas that increases maintenance costs and increases the time required to connect an attachment to an excavator.

Therefore Pemberton self-driven attachment is relatively simple to produce and easy to use when compared to other types of attachment jaw. However, one existing problem with this and similar devices is the amount of time it takes to either connect or disconnect the attachment from the excavator's actuator arm. A number of bolts or locking pins are used to connect points on the jaws to the head, strut and actuator beam of the excavator arm. The separate connection of each of these points to the attachment jaws and the weight of the attachment jaws themselves significantly complicate the connection or disconnection of the attachment to the excavator.

A device known as a quick hitch has also previously been developed in an attempt to speed up and simplify the connection of attachments to excavators. An example of a quick hitch is given in U.S. Pat. No. 5,082,389 to Balemi. This type of device is normally connected to the head and beam ends of an excavator's actuator arm and allows an attachment's connector pins or bolts to be quickly connected to the quick hitch and hence the associated beam and head of the actuator arm. The use of a quick hitch means that only the actuator arm's strut needs to be manhandled and attached separately to the excavator.

It is also preferably for the attachment jaws discussed above to apply the greatest force or pressure possible when the jaws are closed around an object to be cut or crushed. By having strong forces applied when the jaws are closed this substantially speeds up the operation of the excavator and also allows the jaws to cut or crush relatively dense or strong material.

A self-driven shearing pulverising device that solved any or all of the if above problems would be of great advantage relative to the prior art. Specifically a self-driven shearing or pulverising device which could apply high forces to any objects contained within its jaws, and which could be connected to an excavator's actuator arm using a quick hitch or other similar device would be advantageous.

It is an object of the present invention to address the foregoing problems or at least to provide the public with a useful choice.

Further aspects and advantages of the present invention will become apparent from the ensuing description that is given by way of example only.

DISCLOSURE OF INVENTION

According to one aspect of the present invention there is provided an attachment for a prime mover, wherein the attachment includes:

(a) a first jaw being a fixed jaw, and a second jaw, said second jaw being a free jaw which is pivotably connected to the fixed jaw, and (b) at least three connectors which allow the attachment to be connected to the actuator arm of a prime mover, wherein said connectors include:

(i) a head connector adapted to provide a connection to the head of the prime mover's actuator arm, and (ii) a driven connector adapted to provide a connection to the driving beam of the prime mover's actuator arm, and (iii) a strut connector adapted to provide a connection to the strut of the prime mover's actuator arm, wherein the head and driven connectors are associated with the fixed jaw, and the strut connector is associated with the free jaw, the head and driver connectors being connected to the prime mover with a quickhitch, the arrangement and construction being such that when in use the distance between the driven and head connectors remains constant and the distance between the driven and strut or head and strut connectors varies.

According to a further aspect of the present invention there is provided an attachment substantially as described above which includes a quickhitch attached to the head and driven connectors associated with the fixed jaw, said quickhitch being adapted for connection to the head and driving beam of the prime mover's actuator's arm.

An attachment formed in accordance with the present invention may be any type of apparatus or arrangement of elements which is adapted to connect to actuator arm, boom or any piece of machinery that can operate the attachment. Preferably such attachments may be configured to cut, crush, crack, shear, dig, collect, or break up a number of different types of materials. For example in some embodiments the present invention may be used in the demolition industry to provide an attachment which can perform some of the above functions on a demolition site.

Preferably the prime mover which the attachment is adapted to connect to may be an excavator or any other similar type of heavy machinery. These types of machine are well known in the demolition and construction trades and as such will not be described in detail throughout this specification. Those skilled in the art should appreciate that reference to a prime mover may encompass any type of machine which can be adapted to move or operate an attachment configured in accordance with the present invention.

Reference throughout this specification will also be made to the attachment being connected or attached to the actuator arm of an excavator. An excavator may be any type of apparatus known in the art which includes such an actuator arm and which can be used to drive or operate an attachment configured in accordance with the present invention. Further, an excavator used in conjunction with the present invention may include an actuator arm with a head, strut and driven beam-ends on the free end of the actuator arm or boom.

In a preferred embodiment the excavator arm driven beam may be configured as a hydraulic ram where the hydraulic fluid that operates the ram is supplied from the excavator. This configuration of the invention ensures that a hydraulic ram configured as a driven beam in the excavator can be used to operate the present invention.

In a preferred embodiment the present invention may include at least two jaws. The first of these jaws that may be defined as the fixed jaw may be pivotally connected to a second jaw defined as a free jaw. In use at least these two jaws can move towards and away from each other to cut or shear different types of material. Those skilled in the art should also appreciate that other functions are envisioned for the jaws used for the present invention and reference to cutting or shearing material only throughout this specification should in no way be seen as limiting.

Reference throughout this specification shall now also be made to the attachment including two jaws only. Again, it should be appreciated by those skilled in the art that any number and type of jaws may be used in conjunction with the present invention if required.

In a preferred embodiment the attachment may include a number of connectors which allow the attachment to be connected to the actuator arm of an excavator. These attachments are provided to ensure that the excavator can move and operate the attachment effectively.

In a preferred embodiment the attachment may be indirectly connected to an actuator arm through its connectors being connected to a quick hitch which is in turn connected to the head and ram ends of an actuator arm. As discussed previously, an example of a quick hitch is provided in U.S. Pat. No. 5,082,389. This document shows in FIG. 1 two apertures 8,9 that can be connected to the head and ram ends of an actuator arm with a pair of locking pins. Such a device may be used to provide an indirect connection between the excavator arm and the invention using a number of connectors.

Reference throughout this specification will now be made to the attachment being connected to an excavator through a quick hitch. Those skilled in the art should appreciate that any type of quickhitch may be used in conjunction with the present invention which need not necessarily employ the quickhitch design described in U.S. Pat. No. 5,082,389.

In a preferred embodiment the present invention may include three connectors only, where these three connectors may be defined as the head connector, the driven connector and the strut connector.

In a preferred embodiment the attachment jaws may be configured so that the driven connector and head connector are associated with the first or fixed jaw. In such an embodiment the strut connector may also be associated with the second or free jaw.

In a preferred embodiment the first fixed jaw may include or have formed within it a pair of connector pins to create the head and driven connectors. The two pins used as connectors may be permanently welded or attached to the main body of the fixed jaw and will allow the fixed jaw to be quickly attached to a quick hitch.

In some embodiments the strut connector may be configured as a pin slotting into a hollow space within one end of the second or free jaw. The strut connector pin may be removable attached to the free jaw so that the excavator arm strut may be directly connected to the free jaw through the pin being positioned or slotted between both components.

However, in a preferred embodiment the strut connector need not necessarily include a moveable pin that can slot into a space within one end of the second or free jaw. Preferably a strut may be permanently and pivotably attached to the second or free jaw with the opposite free end of the strut extending up to engage with an attachment system located on the excavator arm.

In such an embodiment the free end of the strut may include a bifurcated end assembly with apertures in each bifurcation provided. A single pin may be slotted through each of these apertures where this pin may be grasped and retained by the attachment system used.

The attachment system may also include a housing with a single open face or wall within which the pin located on the end of the strut may be inserted. To retain the strut end's pin and therefore the strut in place, the attachment system may also include a moveable end wall that can be fixed in place over the open end or face of the attachment system housing.

In a further preferred embodiment the moveable end wall of the attachment system may be formed by a hook assembly pivotably attached to the body of the attachment system used to form the open ended housing. The hook used may be arranged so as to pivot into place to cover the open end or face of the attachment system housing and therefore lock in place the pin at the end of the strut when located within the attachment system housing.

This configuration of the invention allows a quick hitch to be used to indirectly connect the fixed jaw of the attachment to the head and ram of the excavator arm. When the attachment is in use the distance between the head connector and driven connector must stay constant as these two connectors are permanently fixed to or integrally formed from the fixed jaw. However, when the fixed and free jaws are brought together the distance between the strut connector and the head or driven connectors varies as the jaws pivot and the strut connector pin rotates to allow the free jaw to move.

Furthermore, the use of an attachment system substantially as discussed above allows a strut permanently attached to the free jaw to be quickly located and locked in place on the excavator. The excavator's operator simply needs to actuate and move the excavator's ram to slide the free end of the strut in place within the attachment system to lock same in place.

The attachment jaws of the present invention may simply be operated by the excavator operator activating the actuator arm hydraulic ram. Operation of the ram will cause the end of the fixed jaw to pivot towards the free jaw.

The combination of the above set of attachment jaws with a quickhitch interposed between the excavator actuator arm and the head and driven connectors provides a substantial increase in the forces applied to close the attachment jaws. The addition of a quickhitch places additional distance between the main pivoting connection of the free and fixed jaws and the actuator arm used to apply a closing force to the jaws. This additional distance substantially increases the leverage that can be applied by the excavator arm to close the quickhitch jaws.

In addition, the use of a quickhitch between the jaws and the excavator places an additional distance between the head connector and the main pivot of the jaws. This will in some embodiments result in the application of an additional significant levering force applied to close the jaws of the attachment. This may be contrasted with an attachment which does not use a quickhitch and which will provide the head connection in close proximity to the main pivot point of the jaws, eliminating the possibility of an additional significant levering force being applied to the jaws.

Furthermore, in some instances the strut connector used may also be positioned on an extended leg or projection formed in the free jaw, which will again increase the distance between the strut connector and the main pivoting connection between the two jaws. Increasing the distance between the point at which the force is applied to the jaws and the main pivotable connection between the jaws will substantially increase the leverage applied to close the jaws.

The present invention provides many potential advantages over existing prior art devices.

The present invention may be used to provide a self-driven excavator attachment that requires no additional sources of pressurised air or fluid to be driven or operated. In such an embodiment the attachment may be operated simply by the use of the hydraulic ram already incorporated into an excavator's actuator arm.

The present invention may also be specifically adapted to connect to an excavator arm using a quick hitch. The use of a quick hitch substantially decreases the amount of time required to connect or disconnect an attachment from the excavator arm.

Furthermore, the attachment system used to connect the end of a strut to an excavator arm also substantially speeds up the connection of the attachment to an excavator. The excavator's operator simply needs to maneuver the free end of the strut permanently connected to the attachment into contact with the attachment system's housing to facilitate the connection of the strut to the excavator arm.

The arrangement and configuration of the attachment discussed above allows it to be combined with quickhitch attachment systems. The mechanical arrangement of the pivot points, levering arms and jaws involved substantially increases the forces applied to close the jaws when a quickhitch is present. As the pivot points for the head and driven connector are further displaced away from the main pivot of the jaws, this substantially increases the levering force applied through these connectors onto any object to be crushed, cut or grasped by the jaws. Through the addition of a quickhitch the attachment may work quickly to cut through dense and strong materials which could cause difficulties to other forms of attachment with lower forces applied to close the attachment jaws.

BRIEF DESCRIPTION OF DRAWINGS

Further aspects of the present invention will become apparent from the ensuing description that is given by way of example only and with reference to the accompanying drawings in which:

FIG. 1 shows an attachment as configured in one embodiment indirectly connected to an excavator via a quick hitch, where the attachment jaws are open; and FIG. 2 shows the same attachment, quick hitch, and excavator arm as shown in FIG. 1 but with the attachment jaws closed.

FIGS. 3 to 5 show an attachment system used to attach a strut permanently connected to the attachment to the excavator arm.

FIGS. 6 and 7 show a force analysis completed on the open jaws of an attachment provided without a quickhitch, and an attachment provided with a quickhitch.

MODES FOR CARRYING OUT THE INVENTION

Figure 6:
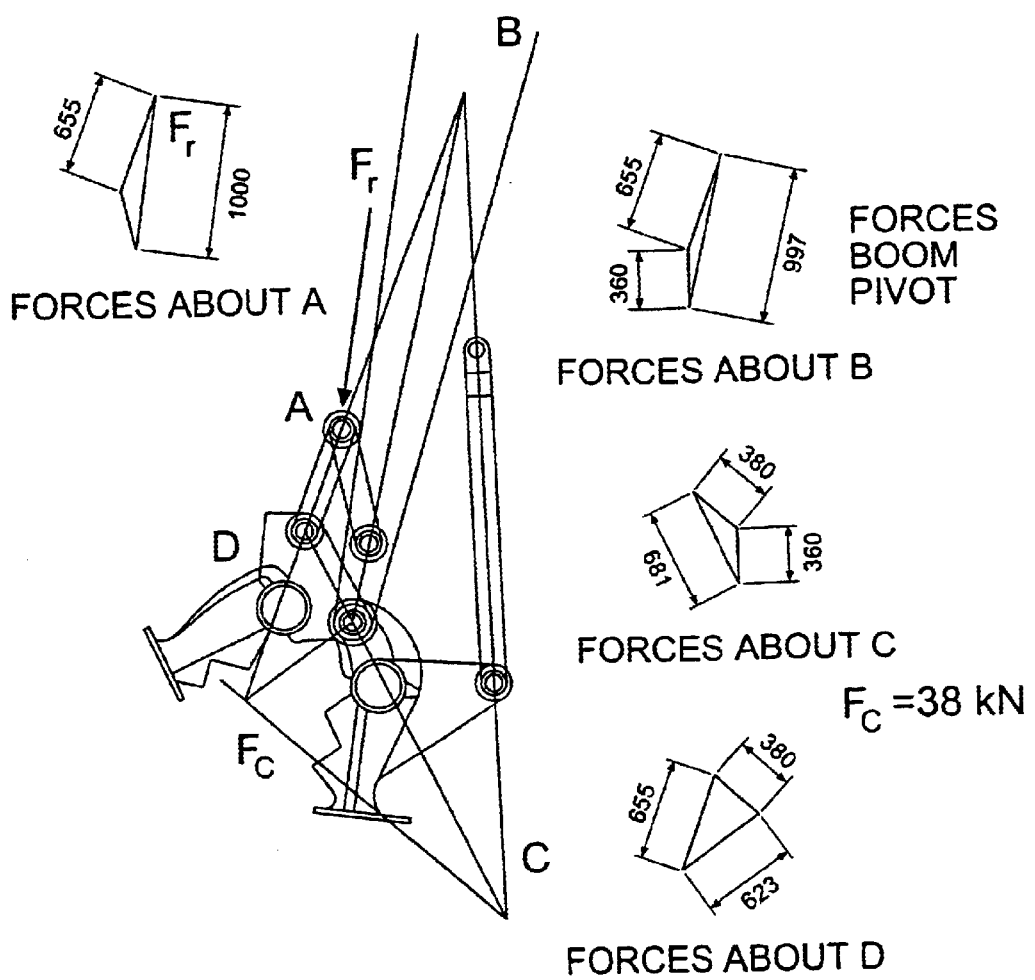

FIG. 1 shows an attachment 1 for an actuator arm 2 of an excavator (not fully shown).

The attachment 1 is indirectly connected to the actuator arm 2 through a quick hitch 3. The quick hitch 3 is directly connected to the actuator arm driven beam 4 and also to the actuator arm head 5. The driven beam 4 is connected to a hydraulic ram (not shown) that is powered or driven by the excavator. In the situation shown in FIG. 1 the excavator ram is retracted. This means that there is no requirement for hydraulic or pneumatic lines to be fitted to the attachment 1 as it may be operated using the excavator's own hydraulic ram and driven beam 4.

The attachment 1 as configured in the embodiment shown is a pair of jaws comprising a first or fixed jaw 6 and a second or free jaw 7. The fixed jaw 6 is pivotally connected to the free jaw 7 by a pivot point 8. The top end 7a of the free jaw is directly connected to the actuator arm strut 9. This strut is connected at its opposite end to the head portion 5 of the arm further away from the attachment.

The fixed jaw 7 includes a removable strut connector pin 10 that is passed through both the end 7a of the free jaw and the end of the strut 9.

The fixed jaw 6 incorporates two connectors being a head connector 11 and a driven connector 12. In the embodiment shown these connectors are formed from pins which are integral parts of the fixed jaw. These head and driven connectors are permanently fixed in place and need not be removed for the invention to function properly or for the attachment to be removed from or be attached to an excavator. The head and beam connectors can be used to easily and quickly connect the attachment to the quick hitch 3.

FIG. 2 shows the same apparatus as FIG. 1 but this time where the hydraulic ram of the driven beam 4 has been extended. In this instance the extension of the excavator's ram will cause the bottom end 6a of the fixed jaw to move round the pivot towards the opposite face of the free jaw 7. At the same time the strut connector pin 10 will move both relative to the head connector 11 and driven connector as the jaws pivot closed.

Even when the excavator's ram is extended the distance between both the fixed jaw head connector 11 and driven connector 12 remain constant, thereby keeping the fixed jaw 6 solidly in contact with the quick hitch 3 and hence the actuator arm 2.

FIGS. 3, 4 and 5 show the steps involved with connecting the end of a strut to an attachment system located on an excavator arm. In the embodiment shown in these figures, one end of the strut may be permanently and pivotably connected to the free end of the attachment jaw, while the attachment system shown can be used to connect the free or opposite end of the strut to the excavator arm.

In the views shown, FIGS. 3a, 4a and 5a show side cross sectional views of the strut end and attachment system, whereas FIGS. 3b, 4b and 5b show simple non cross section side views of the same components.

FIGS. 3a, 3b show a situation where the free end of a strut 20 is detached from an excavator 21 and is to be connected to the excavator arm through use of an attachment system 22. The end of the strut has a bifurcated assembly (not fully shown) with a set of apertures within the bifurcations that are adapted to receive a pin 23.

The attachment system 22 includes a main body portion which defines three walls of a housing 24 which can be used to at least partially enclose the pin 23 located on the end of the strut 20. The attachment system 22 also includes a hook assembly 25 that is pivotably attached at point 26 to the main body of the attachment system.

FIGS. 4a, 4b show the situation where the excavator's operator maneuvers the excavator arm to place the end of the strut 20 into contact with the attachment system 22. As shown in these figures the pin 23 of the strut 20 is maneuvered to locate the pin within the housing 24 of the attachment system.

FIGS. 5a, 5b show the last step in the attachment process. Once the pin 23 has been located within the attachment system housing 24, the hook assembly 25 is pivoted towards the pin 23 so as to close off the open face or end of the housing 24 and therefore lock the pin and associated strut onto the excavator arm 21.

FIG. 6 shows a force analysis completed on the open jaws of an attachment which is provided without a quickhitch, whereas FIG. 7 shows a force analysis completed on the open jaws of an attachment which is provided with a quickhitch.

In both the situations shown the forces present on the driven connector (A) head connector (B) and strut connector (C) are analysed and combined together to give the total closing force applied to the jaws about the main pivot point (D) connecting the free and fixed jaws together.

As can be seen from FIG. 6 the total forces applied to close the jaws about the pivot point (D) result from the addition of three separate forces to provide an overall effective force of 38 kN for the embodiment shown.

Conversely, FIG. 7 shows the situation where the same jaws used in FIG. 6 have a quickhitch interposed between the head and driven connectors and the excavator actuator arm. In this instance, the resultant closing force present about pivotable point (D) is created by four forces combining together to give an overall effective closing force of 65 kN.

As can be appreciated by those skilled in the art the additional distance between the main jaw pivot point (D) and the driven and head connectors (A and B) provide significantly more leverage and an additional force to the jaws when closed.

Aspects of the present invention have been described by way of example only and it should be appreciated that modifications and additions may be made thereto without departing from the scope thereof as defined in the appended claims.

I claim:

1. An attachment for a prime mover, the attachment including,
   (a) a first jaw being a fixed jaw, and a second jaw, said second jaw being a free jaw which is pivotably connected to the fixed jaw, and
   (b) at least three connectors which allow the attachment to be connected to an actuator arm of the prime mover, wherein said connectors include,
      (i) a head connector incorporating a fixed pin adapted to provide a connection to a head of the prime mover's actuator arm, and
      (ii) a driven connector incorporating a fixed pin adapted to provide a connection to a driven beam of the prime mover's actuator arm, said driven beam being used to open and close the first and second jaws, and
      (iii) a strut connector adapted to provide a connection to a strut of the prime mover's actuator arm,
wherein the head and driven connectors are associated with the fixed jaw, and the strut connector is associated with the free jaw, the head and the driven connectors being connected to the prime mover's actuator arm with a quickhitch, the arrangement and construction of the attachment being such when in use the distance between the driven and head connectors remains constant and the distance between the driven and strut or head and strut connectors varies.

2. An attachment as claimed in claim 1 which includes a quickhitch attached to the head and driven connectors associated with the fixed jaw, said quickhitch being adapted to form a connection to the head and driving beam of the prime mover's actuator arm.

3. An attachment as claimed in claim 1 wherein the prime mover is an excavator.

4. An attachment as claimed in claim 1 wherein the driven beam of the prime mover's actuator arm is configured for connection to a hydraulic ram supplied with hydraulic fluid by the prime mover.

5. An attachment as claimed in claim 1 wherein the head and driven connectors are formed from pins permanently attached to the fixed jaw.

6. An attachment as claimed in claim 1 wherein the strut connector is formed through a moveable pin slotted into a hollow space within the free jaw.

7. An attachment as claimed in claim 1 wherein the prime mover strut is permanently connected to the free jaw and a free end of the strut is adapted to engage with an attachment system associated with the prime mover's actuator arm.

8. An attachment as claimed in claim 7 wherein the free end of the strut includes a bifurcated end assembly with apertures provided in each bifurcation.

9. An attachment as claimed in claim 7 wherein the attachment system which the free end of the strut is adapted to engage with includes a housing with a single open face configured to receive a pin provided in the free end of the strut.

10. An attachment as claimed in claim 9 wherein the attachment system includes a moveable end wall adapted to move over the open face of the attachment system housing.

11. An attachment as claimed in claim 10 wherein the moveable end wall is formed from a pivotable hook assembly.

12. An attachment as claimed in claim 8 wherein the attachment system which the free end of the strut is adapted to engage with includes a housing with a single open face configured to receive a pin provided in the free end of the strut.

* * * * *